(12) United States Patent (10) Patent No.: US 9,607,275 B2
Diwakar et al. (45) Date of Patent: Mar. 28, 2017

(54) METHOD AND SYSTEM FOR INTEGRATION OF SYSTEMS MANAGEMENT WITH PROJECT AND PORTFOLIO MANAGEMENT

(75) Inventors: Kiran P. Diwakar, Maharashtra (IN); Sumeet Mathur, Andhra Pradesh (IN)

(73) Assignee: CA, Inc., New York, NY (US)

( * ) Notice: Subject to any disclaimer, the term of this patent is extended or adjusted under 35 U.S.C. 154(b) by 1805 days.

(21) Appl. No.: 12/431,065

(22) Filed: Apr. 28, 2009

(65) Prior Publication Data

US 2010/0274621 A1 Oct. 28, 2010

(51) Int. Cl.
 *G06Q 10/00* (2012.01)
 *G06F 15/173* (2006.01)
 *G06Q 10/06* (2012.01)
 *H04L 29/08* (2006.01)
 *G06Q 50/18* (2012.01)

(52) U.S. Cl.
 CPC ..... *G06Q 10/06* (2013.01); *G06Q 10/063116* (2013.01); *G06Q 50/188* (2013.01); *H04L 29/08072* (2013.01)

(58) Field of Classification Search
 CPC .................. G06Q 10/063116; H04L 29/08072
 USPC .......................................... 705/7.16; 709/224
 See application file for complete search history.

(56) References Cited

U.S. PATENT DOCUMENTS

| | | | |
|---|---|---|---|
| 5,797,129 A * | 8/1998 | Rohan | 705/7.22 |
| 6,571,215 B1 * | 5/2003 | Mahapatro | 705/7.12 |
| 7,315,903 B1 * | 1/2008 | Bowden | H04L 41/0886 709/224 |
| 7,386,465 B1 * | 6/2008 | Friedland et al. | 705/7.21 |
| 7,620,948 B1 * | 11/2009 | Rowe et al. | 717/171 |
| 7,721,290 B2 * | 5/2010 | Horikawa | 718/104 |
| 7,787,492 B2 * | 8/2010 | Timus et al. | 370/468 |
| 2001/0027467 A1 * | 10/2001 | Anderson et al. | 709/201 |
| 2004/0158568 A1 * | 8/2004 | Colle et al. | 707/100 |
| 2005/0132051 A1 * | 6/2005 | Hill et al. | 709/226 |
| 2005/0149940 A1 * | 7/2005 | Calinescu | G06F 9/5061 718/104 |
| 2006/0053043 A1 * | 3/2006 | Clarke | 705/8 |
| 2007/0124431 A1 * | 5/2007 | Sharma | 709/219 |
| 2007/0260502 A1 * | 11/2007 | Motwani et al. | 705/9 |
| 2008/0010490 A1 * | 1/2008 | Revanuru | G06F 11/2028 714/4.1 |
| 2008/0133259 A1 * | 6/2008 | O'Connor et al. | 705/1 |
| 2009/0043625 A1 * | 2/2009 | Yao | 705/7 |

(Continued)

OTHER PUBLICATIONS

Hsiung et al. "Scheduling and Placement of Hardware/Software Real-Time Relocatable Tasks in Dynamically Partially Reconfigurable Systems" (Dec. 2010) ACM Transcations on Reconfigurable Technology and Systems, vol. 4, No. 1, Article 9.*

*Primary Examiner* — Sujay Koneru
(74) *Attorney, Agent, or Firm* — Baker Botts L.L.P.

(57) ABSTRACT

A method for scheduling an information technology (IT) project includes receiving a project request at an interface and determining one or more tasks associated with the project request. The method also includes identifying one or more hardware components coupled to a network operable to perform each of the one or more tasks and retrieving a schedule for each of the identified hardware components. The method further includes selecting a hardware component to perform each of the one or more tasks scheduling each of the selected hardware components to perform each of the one or more tasks.

18 Claims, 2 Drawing Sheets

(56) References Cited

U.S. PATENT DOCUMENTS

2009/0187776 A1* 7/2009 Baba et al. .................. 713/320
2009/0234699 A1* 9/2009 Steinglass et al. ............... 705/9
2009/0254914 A1* 10/2009 Sundaresan et al. ......... 718/103
2009/0281843 A1* 11/2009 Coffman et al. .................. 705/5
2009/0319654 A1* 12/2009 Gonzalez et al. ............ 709/224
2011/0010214 A1* 1/2011 Carruth ............................ 705/8

* cited by examiner

METHOD AND SYSTEM FOR INTEGRATION OF SYSTEMS MANAGEMENT WITH PROJECT AND PORTFOLIO MANAGEMENT

TECHNICAL FIELD OF THE INVENTION

This invention relates generally to the field of information technology and more particularly to a method and system for integration of systems management with project and portfolio management.

BACKGROUND OF THE INVENTION

An information technology (IT) project may typically include several tasks. Each task may require certain personnel to perform the tasks. The availability of the personnel may affect the schedule for the project. In addition to personnel, an IT project may require other resources. The availability of the resources may also affect the schedule of the project.

SUMMARY OF EXAMPLE EMBODIMENTS

In accordance with an embodiment, a method for scheduling an information technology (IT) project includes receiving a project request at an interface and determining one or more tasks associated with the project request. The method also includes identifying one or more hardware components coupled to a network operable to perform each of the one or more tasks and retrieving a schedule for each of the identified hardware components. The method further includes selecting a hardware component to perform each of the one or more tasks scheduling each of the selected hardware components to perform each of the one or more tasks.

In accordance with an embodiment, a system for scheduling an information technology IT project includes an interface and a processor coupled to the interface. The interface is configured to receive a project request. The processor is configured to determine one or more tasks associated with the project request and identify one or more hardware components coupled to a network operable to perform each of the one or more tasks. The processor is also configured to retrieve a schedule for each of the identified hardware components, select a hardware component to perform each of the one or more tasks, and schedule each of the selected hardware components to perform each of the one or more tasks.

Certain embodiments of the invention may provide one or more technical advantages. For example, certain systems and methods may provide a feedback mechanism for a project manager for non-human resources data that allows schedules to be validated before implementing a project. As another example, certain systems and methods may determine the impact of the unavailability of hardware resources on a project and predict hardware requirements of a project based on historical data for hardware already in use. Such information may help justify budgets for hardware projects based on actual data.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
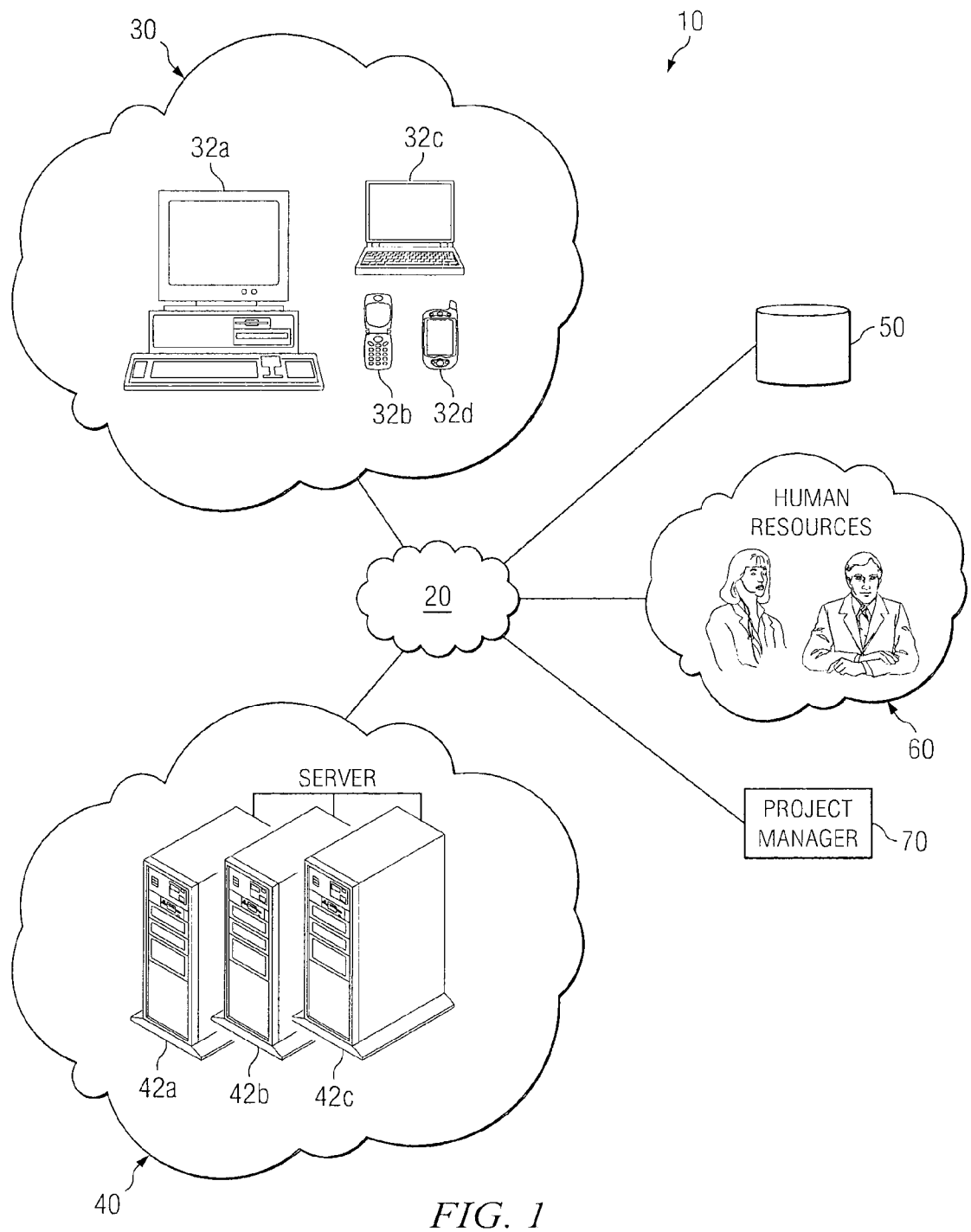
FIG. 1 is a block diagram illustrating one embodiment of a system for managing information technology (IT) projects.
Figure 2:
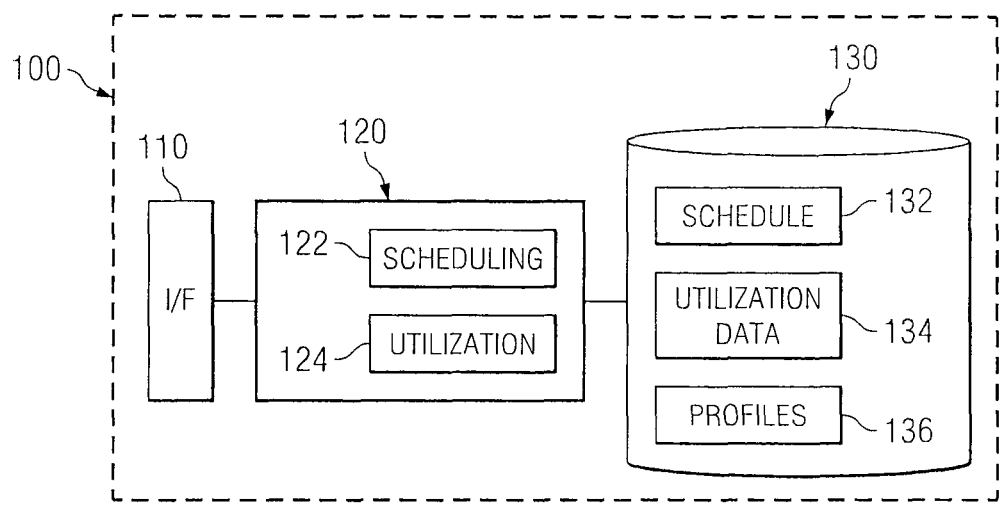
FIG. 2 is a block diagram illustrating a project manager according to a particular embodiment.
Figure 3:
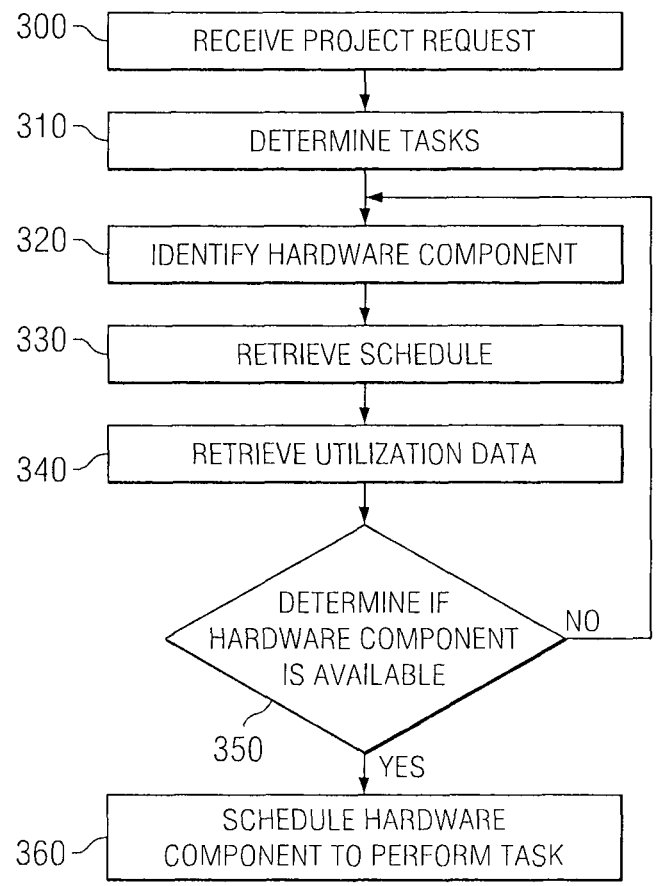
FIG. 3 is a flowchart illustrating an embodiment of a method for scheduling an IT project.

Embodiments of the present invention and its advantages are best understood by referring to FIGS. 1 through 3 of the drawings, like numerals being used for like and corresponding parts of the various drawings. As used in this document, "each" refers to each member of a set or each member of a subset of a set. It should be understood at the outset that, although example implementations of embodiments are illustrated below, the present invention may be implemented using any number of techniques, whether currently known or not. The present invention should in no way be limited to the example implementations, drawings, and techniques illustrated below.

FIG. 1 illustrates a system 10 for managing information technology (IT) projects according to a particular embodiment. System 10 may generally represent an enterprise communication and computing system and comprise one or more of computing environment 30, a server pool 40, one or more databases 50, and/or human resources 60 coupled to a network 20. As illustrated, system 10 also includes a project manager 70 for managing and monitoring system resources within system 10. Examples of system resources may include, but are not limited to, database capacity, central processing unit (CPU) usage, power consumption, and bandwidth.

A typical IT project may comprise multiple tasks, the scheduling of which may depend on the availability of certain resources. For example, a particular task may require, or be better suited for, a specific individual within an enterprise. Thus, the availability of human resources may affect a project schedule. In addition to human resources, an IT Project may also depend on the availability of certain systems (hardware) to perform and execute one or more tasks for the project. As one example, one or more servers 42 in server pool 40 may experience high utilization levels during daytime hours, and thus may be unavailable to perform one or more tasks associated with an IT project during such hours. As another example, a device 32 in computing environment 30 may be scheduled to perform a task for a first project and may not have sufficient resources to perform a task for a second project. The unavailability of components or systems may create problems for development as well as quality assurance (QA), thereby causing delays in deliverables. Thus, the availability of hardware and human resources may each affect the scheduling of tasks for IT projects.

Embodiments of project manager 70 may schedule tasks for one or more projects based on human resources as well as hardware. For example, project manager 70 may account for the availability and/or non-availability of hardware and automatically schedule tasks for a project. In addition to scheduling tasks, project manager 70 may re-schedule tasks and adjust a project timeline in response to events such as unexpected hardware utilization levels and crashes. Embodiments of project manager 70 may also maintain historical project data and use such data for planning and provisioning similar projects in the future. Accordingly, project manager 70 may adaptive plan and provision tasks for one or more projects.

Network 20 represents communication equipment, including hardware and any appropriate controlling logic, for interconnecting elements coupled to enterprise network 20. Network 20 may generally be any communication network capable of transmitting audio and/or video telecommunication signals, data, and/or messages. In certain embodiments, network 20 may comprise all or a portion of a public or private data network, a local area network (LAN), a metropolitan area network (MAN), a wide area network (WAN), or an enterprise intranet. Network 20 may include one or more routers, hubs, switches, or gateways. Although network 20 is illustrated as a single entity, network 20 may comprise any number of networks or interface with other networks such as Internet 22.

Computing environment 30 includes a plurality of interconnected devices 32*a*-32*d*. Devices 32 may generally include any suitable computing or communication device including, but not limited to, laptop computers, desktop computers, personal digital assistants (PDAs), wireline telephones, mobile phones, televisions, or any other device or component capable of facilitating data exchanges over a network. Elements of computing environment 30 may be connected via a fixed broadband connection such as a digital subscriber line (DSL), cable modem, or Ethernet. Elements of computing environment 30 may also be connected wirelessly through a wireless access network (WLAN), worldwide interoperability for microwave access (WiMAX), or wireless fidelity (Wi-FI) access point.

Server pool 40 may include one or more servers 42*a*-42*c* that run server applications. A server 42 may generally be any processor-controlled device or combination of two or more such devices capable of executing a computing operation. In some embodiments, servers 42 may host dedicated applications for components coupled to network 20, such as devices 32. Such applications may include software or other logic embodied in a computer-readable medium that support the transfer of email, files, calls, or other types of communications or data. Examples of server system 40 may include, but are not limited to, a Web server, blade server, or a database server.

Database 50 may represent a data management system that stores data and information associated with components of system 10. Database 50 may include any suitable software and hardware for organizing and storing data. Embodiments of database 50 may store multi-user applications that may be accessed via network 20.

Human resources information 60 may generally represent information and data regarding personnel associated with an enterprise. Human resources information 60 may be stored in any suitable format by any suitable means including, for example, database 50. Human resources information 60 may include availability information such as work schedules and vacation schedules. Human resources information 60 may also include information regarding skills or abilities of personnel, such as programming capabilities, certifications (e.g., Microsoft®, Cisco®, etc.), experience, and/or degrees.

Project manager 70 may generally represent any suitable processor controlled device capable of executing one or more computer operations. Within a network, project manager 70 may logically reside, or be collocated with, a data aggregation point such as, for example, a network manager, a resource manager, or a system hub. In certain embodiments, project manager 70 may be substantially similar to a server 42.

Embodiments of project manager 70 may include one or more computer systems at one or more locations. Each computer system associated with project manager 70 may include one or more suitable input devices, output devices, mass storage media, processors, memory, interfaces, communication ports, or other appropriate components and/or software for receiving, processing, storing, and communicating information according to the operation of system 10.

In operation, project manager 70 may manage one or more tasks associated with one or more projects. Managing one or more tasks may include scheduling tasks to be performed based on the availability of human and system resources. Project manager 70 may also maintain a schedule of tasks to be performed by one or more components of system 10. The schedule of tasks may be accessed by project manager 70 when determining the availability of components to perform subsequent tasks. Embodiments of project manager 70 may include a resource management program such as CA CLARITY™ produced by CA, INC. of ISLANDIA, N.Y., USA.

During operation, project manager 70 may monitor and collect utilization metrics regarding components of system 10. Embodiments of project manager 70 may, for example, receive utilization metrics from a collection agent residing on a server 42 or device 32, though one of skill in the art will appreciate that any suitable means of collection may be used. Example utilization metrics may include system level metrics (e.g., clustered environment and virtualized environment) as well as applications level metrics, however, utilization metrics may vary depending upon the characteristics of the monitored component. For example, utilization metrics may include memory utilization metrics, such as paging metrics, swapping metrics, and available memory metrics. As another example, utilization metrics may include CPU utilization metrics at a particular server machine 42 or device 32. It should be understood that, utilization metrics could also be collected by a system management program such as UNICENTER® NETWORK AND SYSTEMS MANAGEMENT SYSTEMS PERFORMANCE OPTION r3.0 ("NSM SPO") produced by CA, INC. of ISLANDIA, N.Y., USA. In any case, project manager 70 may use utilization metrics to determine level of activity of components of system 10.

Embodiments of project manager 70 may store historical utilization metrics in, for example, a database 50 or a local memory. The historical utilization metrics may be used by project manager 70 to identify trends and patterns relating to the monitored utilization metrics. Such trends and patterns may be used by project manager 70 to forecast future utilization levels for components of system 10. For example, if the CPU usage of a server 42 is particularly high during certain time(s) of a day, week, month, or year, project manager 70 may identify such a pattern and apply it when planning and provisioning projects.

In a typical scenario, a user or systems manager at a device 32 may send a project request to project manager 70. The project request may include certain project specifications and parameters, such as the type of project and hardware and/or software requirements for the project. In certain embodiments a project request may specify the relevant utilization metrics for the components needed to perform one or more tasks for a project. Example project requests may include, installing a new server 42, upgrading software for one or more components of system 10, installing a security patch for components associated with an enterprise network.

In response to receiving a project request, project manager 70 may schedule the one or more tasks associated with the project. The scheduling of tasks may be based on, for example, the availability of the component(s) identified in the project request or that are needed to perform the task. For instance, assume project manager 70 determines that a particular task requires 50% of the CPU capacity of a server 42 for 8 hours. Project manager 70 may select a server 42 from server pool 40 having such capacity and availability. This selection may be based on the current and/or forecasted utilization metrics for the servers 42, as well as previously scheduled tasks assigned to servers 42. Selecting a server 42 may include both identifying a logical address, such as an IP address for a server 42 that can handle the request, as well as a time when the selected server is available. Once a time and a server 42 is identified, the task may be scheduled. After scheduling a task project manager 70 may proceed with scheduling a next task associated with the project. Once all the tasks for a project have been scheduled, project manager 70 may generate a schedule for the project comprising the schedule for each task associated with the project. The schedule may be returned to the user that submitted the project request.

Project manager 70 may also schedule projects based on the availability of human resources. As one example, a particular task may require the ability to program in Java™. Accordingly, project manager 70 may search human resources information 60 for personnel with knowledge of Java™. Once such personnel is identified, project manager 70 may determine the availability of such personnel and use such information for scheduling the project.

It should be understood that modifications, additions, or omissions may be made to system 10. Additionally, while the embodiment of system 10 illustrated in FIG. 1 includes particular components that are each configured to provide certain functionality, alternative embodiments may include any appropriate combination of components with the described functionality divided between the components in any suitable manner.

FIG. 2 is a block diagram illustrating some of the components of a project manager 100, in accordance with a particular embodiment. Project manager 100 may be similar to, and provide similar functionality as, project manager 70 depicted in FIG. 1. According to the illustrated embodiment, project manager 100 includes an interface 110, a processing module 120, and a memory 130. However, different embodiments may include all, some, or none of the components depicted in FIG. 2. Furthermore, project manager 100 may be a separate stand alone device or it may be incorporated into or a part of another device.

Interface 110 may be any port or connection, real or virtual, including any suitable hardware and/or software that may allow project manager 100 to exchange information and signals. Examples of interface 110 include a network interface card (NIC), Ethernet driver, universal serial bus (USB) drive, network card and/or firewall.

Processor 120 may be coupled to interface 110 and control the operation of project manager 100. In particular, processor 120 may execute commands and instructions associated with services provided by traffic analyzer 100. Examples of processor 120 include, application-specific integrated circuits (ASICs), field-programmable gate arrays (FGPAs), digital signal processors (DSPs), and any other suitable specific or general purpose processors.

As illustrated, processor 120 may include a scheduling module 122, and a utilization module 124. Scheduling module 122 may generally provide project and portfolio management (PPM) capabilities for project manager 70. In particular, scheduling module 122 may schedule projects and monitor real-time project status to provide control and capacity planning. Embodiments of scheduling module 122 may include CA CLARITY™ software. Utilization module 124 may monitor real-time and historical utilization metrics for one or more components coupled to a network. Embodiments of utilization module 122 may include software or code associated with the CA Unicenter® NSM-SPO.

Memory 130 may be coupled to processor 130 and/or interface 120. Memory 130 may store processor instructions and/or any other appropriate information used by project manager 100. Examples of memory 130 may include random access memory (RAM) devices, dynamic random access memory (DRAM), read only memory (ROM) devices, magnetic storage devices, optical storage devices, flash memory, or any other suitable data storage medium.

Embodiments of memory 130 may store a schedule 132, utilization data 134, and profiles 136. A schedule 132 may generally include any suitable information regarding the assignment(s) of hardware, software, and/or human resources for a project. The schedule may include an identifier or address associated with a resource and a time that a particular resource is scheduled for a task. Schedule 132 may be generated by scheduling module 122. Utilization data 134 may generally include historical utilization metrics for one or more components coupled to a network. Utilization data may also include one or more forecasted utilization levels for one or more components coupled to a network. Profiles 136 may include information or data associated with personnel at an enterprise or hardware within the IT infrastructure of an enterprise. Profiles 136 may include information similar to human resources information 60 of FIG. 1. For example, a profile may indicate that a particular individual has a certain skill set (e.g., can program in JAVA), which may be needed to perform a task for a project. As another example, a profile may indicate the processing capacity of a server, such as a server 42 of FIG. 1. Profiles 136 may also include a project profile that identifies the tasks associated with a particular project. For instance, a project profile may indicate that installing a security patch across an enterprise network may require specified resources from a server, a database, and a computer. In various embodiments, the project profile may be updated based on previous resource and hardware allocations for project tasks, such that optimal allocations may be enforced.

In a typical scenario, a project request may be received by project manager 100 via interface 110. The project request may be forwarded to processor 120 for scheduling. Processor 120 may initially determine one or more tasks associated with a project request from, for example, the project request itself or retrieving a profile 136 from memory 130. Determining the tasks associated with a task may include identifying one or more components needed for the task as well as the resources (or utilization metrics) needed for the task.

To schedule a task, scheduler 122 may access a schedule 132 and utilization data 134 associated with the identified component(s). Based on the schedule 132 and utilization data 134, scheduler 122 may determine the availability of each identified component. For example, schedule 132 may indicate that an identified component is unavailable because it is scheduled to perform a task for another project at a particular time. Utilization data 134 may indicate one or more periods when an identified component may be, or is predicted to be, unavailable due to, for example, insufficient resource capacity to handle the request. Once the availability of an identified component is determined, scheduler 122 may schedule a task for a project by updating or creating a new schedule 132.

In operation, scheduling module 122 and utilization module 124 may interact to provide proactive provisioning and planning for project tasks. In particular, utilization module 124 may provide scheduling module 122 with real-time information regarding the availability or non-availability of hardware. The real-time information may facilitate the adjustment of a project schedule based on events such as crashes, unexpected utilization levels, and/or service interruptions. For instance, utilization module 124 may determine that a piece of system hardware that was performing a task, or scheduled to perform a particular task has crashed and forward an update to scheduling module 122. In response to receiving the update, scheduling module 122 may adjust the schedule for the projects with tasks assigned to the particular component and/or reallocate hardware resources among tasks. In addition, utilization data 134 may be used by scheduling module 122 to anticipate the possible future utilization of hardware and determine whether reinforcement capacity is needed to meet the demands of future projects.

It should be understood that scheduling module 122 and utilization module 124 may be implemented as logic or code embodied in a computer readable medium. In certain embodiments, the code may be stored in memory 130 and executed by processor 120. It should also be understood that components of project manager 100 may be combined, eliminated, or otherwise modified. In addition, scheduling 122 and utilization module 124 may logically reside remotely from each other and each may be associated with a unique processor 120.

With reference to FIG. 3, a flowchart illustrating an example method for scheduling an IT project is provided. The illustrated method may be performed by one or more components of project manager 100 discussed with respect to FIG. 2. Additionally, the illustrated method may be implemented as logic or code embodied on a computer embodied in a computer readable medium.

The illustrated method begins at step 300 wherein a project request is received. In response to receiving a project request, processor 120 may determine one or more tasks associated with the project request at step 310. Determining one or more tasks associated with the project may include determining the utilization metrics and hardware components needed for the task. Step 310 may involve retrieving a project profile that defines the tasks associated with a particular project request. The project profile may also indicate the best components and resource allocations (utilization metrics) to perform each task associated with the project.

Next, at step 320, a hardware component within a network required to perform each of the one or more tasks is identified. In some embodiments, multiple hardware components capable of performing a particular task may be identified. Similar to step 310, step 320 may include retrieving a project profile for the project request, the project profile indicating the components capable of performing the tasks for a given project. For each identified hardware component, a schedule for the component and utilization data for the component may be retrieved at steps 330 and 340, respectively. As mentioned, the utilization data may include a forecasted or predicted utilization metrics for each hardware component based on historical utilization trends.

At step 350, it may be determined whether the hardware component is available to perform the task. This determination may include determining a current or forecasted utilization metric for the component, determining the threshold utilization metric for the component, and determining whether the component has available capacity to perform the task based on the required utilization metric(s) for the task. This determination may also include determining whether the hardware component is available at the time requested in the project request. It should be noted that, in some scenarios, multiple hardware components may have been identified in step 320. Accordingly, step 350 may be repeated for each of the hardware components identified in step 320. If the identified component(s) is not available, then the method may return to step 320 and one or more alternate components may be identified to perform the task or the project schedule may be delayed. If the identified component(s) is available, the method may proceed to step 360.

At step 360, a task may be scheduled. Step 360 may include updating a schedule for the selected component to indicate that the hardware component is unavailable or, if the task only requires a portion of the components resources, be partially unavailable at a particular time. In scenarios where multiple hardware components were identified as available, step 360 may involve selecting among the available hardware components. This selection may be based on, for example, current or forecasted utilization metrics for the components, threshold utilization metrics for the components, and/or which components have available capacity to perform the task based on the required utilization metric(s) for the task.

One skilled in the art will readily recognize that some of the steps illustrated in FIG. 3 may be combined, modified or deleted where appropriate, and additional steps may also be added to the flowchart. For instance, the method may also include determining one or more persons needed to perform the task and scheduling the task based on the availability of the one or more persons in addition to the hardware components. It should also be understood that steps may be performed in any suitable order without departing from the intended scope of the invention.

Further, while the present invention has been described in detail with reference to particular embodiments, it should be understood that various other changes, substitutions, and alterations may be made hereto without departing from the spirit and scope of the present invention. Numerous other changes, substitutions, variations, and modifications may be ascertained by those skilled in the art and it is intended that the present invention encompass all such changes, substitutions, variations, and modifications as falling within the spirit and scope of the appended claims.

What is claimed is:

1. A method for scheduling an information technology (IT) project, comprising:
    receiving a project request at an interface of a project manager comprising one or more processors, the project request comprising a required utilization metric for a plurality of tasks associated with the request;
    determining, using the one or more processors, the plurality of tasks associated with the project request;
    for each one of the plurality of tasks associated with the request, identifying a plurality of servers in a server pool, each one of the plurality of servers coupled to the project manager via a network, each of the plurality of servers in the server pool operable to perform at least one of the plurality tasks;
    retrieving a schedule for each of the plurality of servers in the server pool;

receiving historical utilization metrics from a collection agent that monitors servers in the server pool;

forecasting a future utilization level for at least one of the plurality of servers based on the historical utilization metrics indicating a trend or pattern;

determining a threshold utilization metric for each of the plurality of servers in the server pool;

for each one of the plurality of tasks, selecting, using the one or more processors, a one of the servers from the plurality of servers in the server pool that has capacity to perform an associated one of the plurality of tasks, wherein selection of the servers to perform the tasks is based on:

the schedule for each one of the plurality of servers in the server pool, the future utilization level forecasted for at least one of the plurality of servers, and the threshold utilization metric for each of the plurality of servers in the server pool, p1 scheduling each of the plurality of servers selected to perform an associated one of the plurality of task to perform the associated one of the plurality of tasks;

determining that a piece of hardware associated with one of the plurality of servers scheduled to perform the associated one of the plurality of tasks has crashed; and re-scheduling one or more tasks and adjusting a project timeline of each of the plurality of servers selected to perform the plurality of tasks associated with the request.

2. The method of claim 1, wherein determining the plurality of tasks associated with the project request comprises retrieving a project profile, the project profile defining the plurality of tasks associated with the project request.

3. The method of claim 1, further comprising, for each of the plurality of servers in the server pool, retrieving utilization data, the utilization data indicating utilization metrics of an associated one of the plurality of servers at a first time.

4. The method of claim 3, wherein the utilization data comprises predicted utilization metrics, the predicted utilization metrics comprising forecasted utilization metrics at a second time.

5. The method of claim 1, further comprising:

determining a current utilization metric for each of the plurality of servers in the server pool; and determining a required utilization metric for each of the plurality of tasks.

6. The method of claim 1, further comprising:

determining one or more persons needed to perform each of the plurality of tasks;

determining an availability of each of the one or more persons needed to perform each of the plurality of tasks; and wherein scheduling the one of the plurality of servers to perform the associated one of the plurality of tasks comprises scheduling one of the plurality of servers in the server pool to perform the associated one of the plurality of tasks when each of the one or more persons needed to perform the associated one of the plurality of tasks is available.

7. A system for scheduling an information technology (IT) project, comprising:

an interface configured to receive a project request, the project request comprising a required utilization metric for a plurality of tasks associated with the request;

a processor coupled to the interface, the processor configured to:

determine the plurality of tasks associated with the project request;

for each one of the plurality of tasks associated with the request, identifying a plurality of servers in a server pool, each one of the plurality of servers coupled to the processor, each of the plurality of servers in the server pool operable to perform at least one of the plurality tasks;

retrieve a schedule for each of the plurality of servers in the server pool;

receive historical utilization metrics from a collection agent that monitors servers in the server pool;

forecast a future utilization level for at least one of the plurality of servers based on the historical utilization metrics indicating a trend or pattern;

determine a threshold utilization metric for each of the plurality of servers in the server pool;

for each one of the plurality of tasks, select a one of the servers from the plurality of servers in the server pool that has capacity to perform an associated one of the plurality of tasks, wherein selection of the servers to perform the tasks is based on:

the schedule for each one of the plurality of servers in the server pool, the future utilization level forecasted for at least one of the plurality of servers, and the threshold utilization metric for each of the plurality of servers in the server pool, schedule each of the plurality of servers selected to perform an associated one of the plurality of task to perform the associated one of the plurality of tasks;

determine that a piece of hardware associated with one of the plurality of servers scheduled to perform the associated one of the plurality of tasks has crashed; and re-scheduling one or more tasks and adjusting a project timeline of each of the plurality of servers selected to perform the plurality of tasks associated with the request.

8. The server of claim 7, wherein when determining the plurality of tasks associated with the project request the processor is configured to retrieve a project profile, the project profile defining the plurality of tasks associated with the project request.

9. The server of claim 7, wherein the processor is further configured to:

for each of the plurality of servers in the server pool, retrieve utilization data, the utilization data indicating utilization metrics of an associated one of the plurality of servers at a first time.

10. The system of claim 9, wherein the utilization data comprises predicted utilization metrics, the predicted utilization metrics comprising forecasted utilization metrics at a second time.

11. The system of claim 7, wherein the processor is further configured to:

determine a current utilization metric for each of the plurality of servers in the server pool; and determine a required utilization metric for each of the plurality of tasks.

12. The system of claim 7, wherein the processor is further configured to:

determine one or more persons needed to perform each of the plurality of tasks;

determine an availability of each of the one or more persons needed to perform each of the plurality of tasks; and wherein, when scheduling the one of the plurality of servers to perform the associated one of the plurality of tasks, the processor is configured to schedule one of the plurality of servers in the server pool to perform the associated one of the plurality of tasks when each of the one or more persons needed to perform the associated one of the plurality of tasks is available.

13. A non-transitory computer readable medium comprising software for scheduling an information technology (IT) project, the software comprising computer code such that when executed is operable to:
receive a project request, the project request comprising a required utilization metric for a plurality of tasks associated with the request;
determine the plurality of tasks associated with the project request;
for each one of the plurality of tasks associated with the request, identifying a plurality of servers in a server pool, each one of the plurality of servers coupled to the processor, each of the plurality of servers in the server pool operable to perform at least one of the plurality tasks;
retrieve a schedule for each of the plurality of servers in the server pool;
receive historical utilization metrics from a collection agent that monitors servers in the server pool;
forecast a future utilization level for at least one of the plurality of servers based on the historical utilization metrics indicating a trend or pattern;
determine a threshold utilization metric for each of the plurality of servers in the server pool;
for each one of the plurality of tasks, select a one of the servers from the plurality of servers in the server pool that has capacity to perform an associated one of the plurality of tasks, wherein selection of the servers to perform the tasks is based on:
the schedule for each one of the plurality of servers in the server pool,
the future utilization level forecasted for at least one of the plurality of servers, and
the threshold utilization metric for each of the plurality of servers in the server pool,
schedule each of the plurality of servers selected to perform an associated one of the plurality of task to perform the associated one of the plurality of tasks;
determine that a piece of hardware associated with one of the plurality of servers scheduled to perform the associated one of the plurality of tasks has crashed; and
re-scheduling one or more tasks and adjusting a project timeline of each of the plurality of servers selected to perform the plurality of tasks associated with the request.

14. The non-transitory computer readable medium of claim 13, wherein when executed the software is further operable to determine the plurality of tasks associated with the project request the processor is configured to retrieve a project profile, the project profile defining the plurality of tasks associated with the project request.

15. The non-transitory computer readable medium of claim 13, wherein when executed the software is further operable to:
for each of the plurality of servers in the server pool, retrieve utilization data, the utilization data indicating utilization metrics of an associated one of the plurality of servers at a first time.

16. The non-transitory computer readable medium of claim 15, wherein the utilization data comprises predicted utilization metrics, the predicted utilization metrics comprising forecasted utilization metrics at a second time.

17. The non-transitory computer readable medium of claim 13, wherein when executed the software is further operable to:
determine a current utilization metric for each of the plurality of servers in the server pool; and
determine a required utilization metric for each of the plurality of tasks.

18. The non-transitory computer readable medium of claim 13, wherein when executed the software is further operable to:
determine one or more persons needed to perform each of the plurality of tasks;
determine an availability of each of the one or more persons needed to perform each of the plurality of tasks; and
wherein scheduling the one of the plurality of servers to perform the associated one of the plurality of tasks comprises scheduling one of the plurality of servers in the server pool to perform the associated one of the plurality of tasks when each of the one or more persons needed to perform the associated one of the plurality of tasks is available.

* * * * *